United States Patent [19]

Ubaldi et al.

[11] 4,114,562
[45] Sep. 19, 1978

[54] IMPREGNATION FURNACES FOR CARBON ARTICLES

[75] Inventors: Luciano Ubaldi, Rome; Osvaldo Buccella, Terni, both of Italy

[73] Assignee: Elettrocarbonium S.p.A., Milan, Italy

[21] Appl. No.: 785,560

[22] Filed: Apr. 7, 1977

[30] Foreign Application Priority Data

Apr. 14, 1976 [IT] Italy ............................... 49036 A/76

[51] Int. Cl.² .......................... B05C 3/09; B05C 9/08
[52] U.S. Cl. ........................................ 118/50; 118/47
[58] Field of Search ...................... 23/290; 118/47, 50, 118/50.1

[56] References Cited

U.S. PATENT DOCUMENTS 3,206,331  9/1965  Diefendorf .................. 118/47 X
3,759,217  9/1973  Wiegmann .................. 118/50 X

*Primary Examiner*—Wm. Carter Reynolds
*Attorney, Agent, or Firm*—DeLio and Montgomery

[57] ABSTRACT

A furnace of autoclave for heat treatment of carbon articles impregnated with a fluid medium, which is provided with a smoke-elimination system including means for supplying clean air under pressure to the closed furnace and exhausting said air through a smoke incinerator or other cleaning means, and means for supplying clean air by suction to the top of the open furnace and exhausting said air through the same cleaning means. Valves are provided to control the admission and draining off of the fluid medium and to determine the course of flow of the air in order to carry out the method of operation.

2 Claims, 1 Drawing Figure

U.S. Patent  Sept. 19, 1978  4,114,562
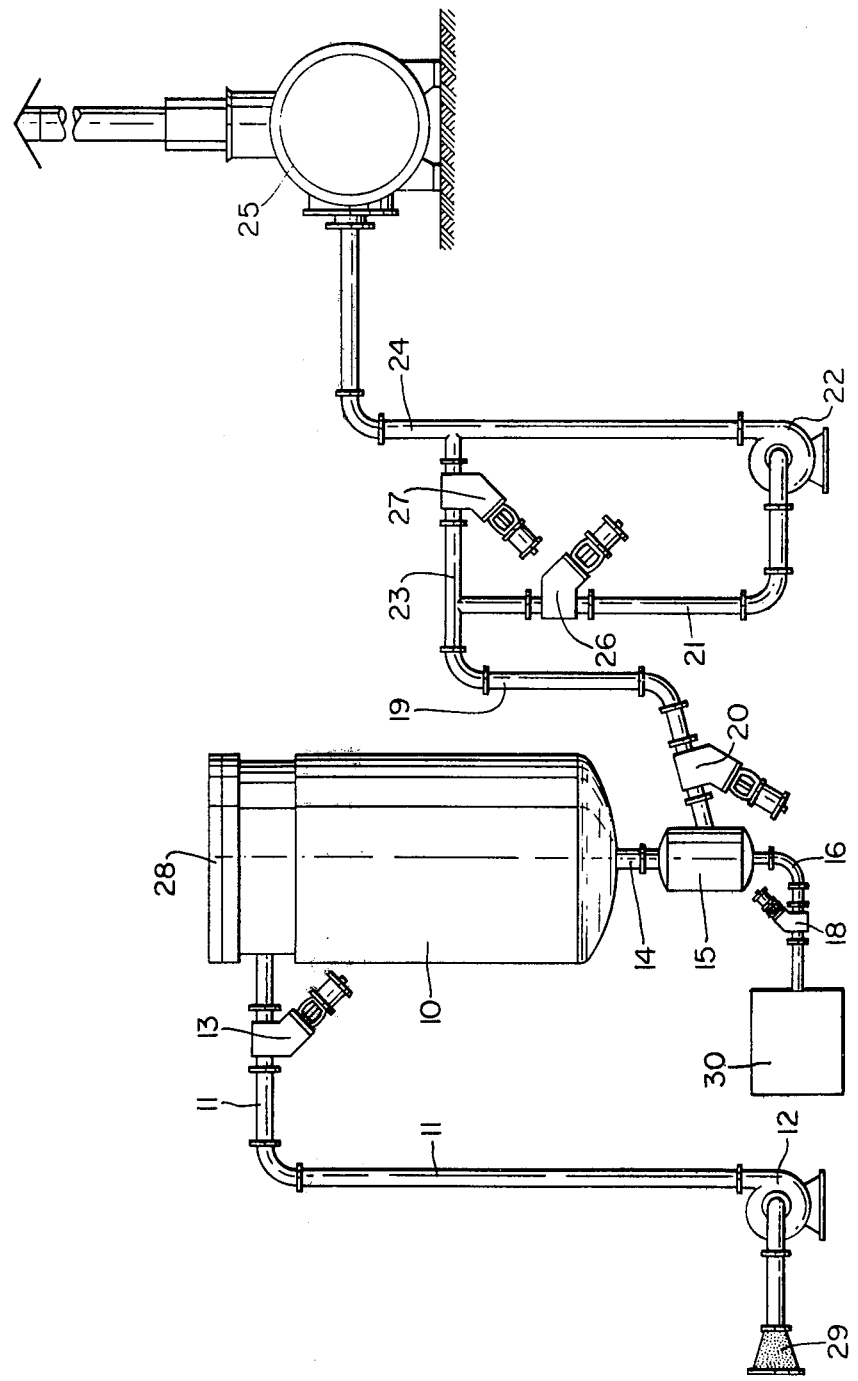

IMPREGNATION FURNACES FOR CARBON ARTICLES

This invention relates to an improvement in the impregnation furnaces for carbon articles. More specifically, the invention aims at providing the furnaces with means for cooling the impregnated articles and eliminating the smoke (arising from the surface of the impregnated articles), directly within the autoclave.

The synthetic carbon articles are made of coke powder held together by means of a binder (pitch, tar, resin) and are firstly preshaped by means of any one of the various processes of pressing, extrusion, vibration and the like.

The next step is the baking step, which leaves the articles rather porous.

In order to reduce or even eliminate the article porosity, the articles are impregnated with any substance which, after a rebaking, polymerization or curing process, leaves a coke residue in the pores, having the function of increasing the apparent density of the articles.

In the above mentioned furnaces the impregnation process includes the following steps:

(1) heating the articles to a temperature sufficient for eliminating water, oils and the like and obtaining a first partial elimination of air from the pores (through air expansion caused by heating);

(2) putting the articles into the hot autoclave and vacuum removing the air from the pores;

(3) putting the impregnant (maintained at the temperature of maximum fluidity thereof) into the autoclave and increasing the local pressure to help the impregnant penetration into the pores;

(4) removing the pressure from the autoclave and removing the exceeding impregnant (that is the impregnant which has not penetrated the material to be impregnated);

(5) uncovering the autoclave and removing the impregnated articles; and (6) cooling the articles in water, air and the like.

Then the impregnated articles are fed into the heat treatment apparatus which comprises polymerization for resins, baking for pitch and tar, and so on.

In the furnaces of the kind set forth, these processes suffer from the disadvantage that, during the autoclave uncovering, a large quantity of smoke develops from the outer surface of the impregnated articles, which is still hot.

On the contrary, in the improved apparatus of the invention, the impregnated articles are completely or partially cooled inside the autoclave, before uncovering the same, through an atmospheric air flow, while the smoke is completely drawn before and after opening the autoclave cover.

As a matter of fact, after having removed the pressure and the exceeding impregnant, by means of a fan suitably associated to the autoclave, cold and clean atmospheric air is blown onto the impregnated articles, the air being fed into the autoclave, when it is still closed. The air flow so induced cools the articles and conveys the removed smoke towards a smoke filtering device.

After a certain time, the cover of the autoclave is removed and simultaneously an aspirator is operated which conveys the residual smoke towards the bottom of the autoclave and then again towards the smoke filtering device.

In this way the advantage is also obtained that most of the smoke (condensable) which firstly rises, does not pass through the blowing device and, accordingly, only clean air passes therethrough; thus, damaging carbon deposits are avoided, while the drawback of carbon deposits on the suction fan, at the bottom of the autoclave, is minimized as the residual smoke, after this step, is now almost negligible.

The improvement, according to the present invention, will be now desclosed in detail with reference to the embodiment thereof illustrated in the annexed drawing.

In the drawing a pipe 11 connects a fan 12 to the upper portion of autoclave 10. Fan 12 is adapted to draw atmospheric air and to blow the same into autoclave 10 through pipe 11, wherein a suitable valve 13 is located.

A drop separator 15 is connected to the autoclave bottom by a short tube 14. A pipe 16 leads to drop separator 15 for feeding the impregnant under control of valve 18 to the impregnant supplying source 30.

Furthermore, a pipe 19 starting at drop separator 15 and controlled by valve 20 is connected to a vacuum device 22, by a tube 21, and, by a short length of tube 23, to pipe 24, connecting vacuum device 22 to a smoke eliminator 25, such as an incinerator. It is to be pointed out that tube 21 is controlled by valve 26 and tube 23 is controlled by valve 27.

With such an arrangement, after the pressure has been removed from the furnace and the impregnant exhausted through the suitably opened valve 18, fan 12 is operated after valve 13, 20 and 27 have been opened and valve 26 has been closed. Under these conditions, atmospheric air drawn through filter 29 is blown to the upper portion of autoclave 10, wherein the air flows over the articles, within the autoclave (not shown), and charges with the smoke, developed therefrom, exchange heat with the impregnated articles, passes downwardly through the autoclave and is exhausted through tube 14. Then, once the larger drops have been condensed within container 15, the air is fed to smoke incinerator 25.

After a suitable time, fan 12 is stopped, valves 13 and 27 are closed and valve 26 is opened, operating aspirator 22 and, then, slowly beginning to remove cover 28. As a result, aspirator 22 draws the residual smoke towards the autoclave bottom, which smoke is not exhausted through the opening but is conveniently fed to a suitable filtering or eliminating device, thus avoiding any pollution of the work environment.

As the persons skilled in this art will easily understand, the apparatus of the invention could also be realized differently combining or arranging the parts by which, before removing the cover, a fresh air flow is fed into the autoclave in order to cool the impregnated articles and remove the smoke feeding the same to a suitable smoke filtering device. Accordingly, it is to be understood that the invention is not intended to be restricted to the embodiment here illustrated and described.

What is claimed is:

1. In combination with an impregnation furnace for carbon articles making use of impregnants, comprising an autoclave in which the impregnation process takes place, the autoclave being closed by a cover, an apparatus for completely drawing the smoke developed during the impregnation process including: fan means adapted to draw atmospheric air and connected to the upper portion of said autoclave by means of a first pipe; first valve means controlling said first pipe; a drop separating means connected to the bottom of said autoclave through a short length of tube, and to the impregnant supplying source through a second pipe, controlled by a second valve means, said drop separating means being provided with a third pipe which is controlled by a third valve means; drawing means provided with an inlet pipe, controlled by a fourth valve means and connected to said third pipe and a fourth pipe connected to said third pipe, through a tube controlled by fifth valve means and directly connected to a smoke eliminating device; these parts being so arranged as, once the impregnation process under pressure has been performed in the autoclave, owing to said impregnant being heated to the temperature of maximum fluidity, said impregnant is removed through said second pipe, said second valve means being opened and, while maintaining the autoclave closed by said cover, said first, third and fifth valve means are opened and said fan means is operated, which blows a flow of relatively cold and clean atmospheric air into the upper portion of the autoclave and then onto the impregnated articles in said autoclave, in relative heat exchange relationship, said air flow charging with most of the smoke developed during the impregnation process; air flow being then fed to said smoke eliminating device, having left the largest particles inside said drop separating means; after a suitable time, said fan means is stopped, said first and fifth valve means are closed and said fourth valve means is opened, while operating said drawing means and, simultaneously, slowly removing said autoclave cover, while the residual smoke is drawn towards the autoclave bottom through the drop separating means and then sent to said smoke eliminating device as well.

2. Apparatus according to claim 1, wherein said fan means is provided with filter means, wherethrough atmospheric air is intaken.

* * * * *